US011272129B2

(12) United States Patent
Rotte et al.

(10) Patent No.: US 11,272,129 B2
(45) Date of Patent: Mar. 8, 2022

(54) IMAGER WITH VERTICAL ROW ADDRESSING

(71) Applicant: GVBB HOLDINGS S.A.R.L., Luxembourg (LU)

(72) Inventors: Jeroen Rotte, Breda (NL); Juul Josephus Johannes Van Den Heijkant, Breda (NL); Rik Visser, Everdingen (NL)

(73) Assignee: GRASS VALLEY CANADA, Montreal (CA)

( * ) Notice: Subject to any disclaimer, the term of this patent is extended or adjusted under 35 U.S.C. 154(b) by 0 days.

(21) Appl. No.: 16/750,602

(22) Filed: Jan. 23, 2020

(65) Prior Publication Data
US 2020/0162683 A1  May 21, 2020

Related U.S. Application Data

(63) Continuation-in-part of application No. 16/389,772, filed on Apr. 19, 2019, which is a continuation of (Continued)

(51) Int. Cl.
*H04N 5/3745* (2011.01)
*H04N 5/357* (2011.01)
(Continued)

(52) U.S. Cl.
CPC ....... *H04N 5/3745* (2013.01); *H04N 5/23216* (2013.01); *H04N 5/343* (2013.01);
(Continued)

(58) Field of Classification Search
None
See application file for complete search history.

(56) References Cited

U.S. PATENT DOCUMENTS

| 8,471,315 B1 | 6/2013 | Hynecek et al. |
| 2005/0057674 A1 | 3/2005 | Krymski et al. |

(Continued)

FOREIGN PATENT DOCUMENTS

| EP | 1139658 A2 | 5/2005 |
| JP | 2010268529 A | 11/2010 |

OTHER PUBLICATIONS

Non-Final Office Action dated Apr. 11, 2018, issued in U.S. Appl. No. 15/362,023.
(Continued)

*Primary Examiner* — Mark T Monk
(74) *Attorney, Agent, or Firm* — Arent Fox LLP

(57) ABSTRACT

An imager that includes a pixel array with a plurality of columns having rows of pixels and with each pixel having a plurality of photodiodes and a common readout circuit that stores respective accumulation voltages from each of the plurality of photodiodes. The imager further includes row driver circuitry that controls the pixel array for pixel addressing and readout, with the row driver circuitry including a plurality of shift registers, and an image sensor controller that controls the plurality of shift registers to address the rows of pixels in the pixel array. Moreover, the row driver circuitry dynamically upward and downward shifts control signals to the pixel array, such that two rows of pixels in a single column of the pixel array are addressed during a single row time.

22 Claims, 11 Drawing Sheets

Related U.S. Application Data application No. 15/697,349, filed on Sep. 6, 2017, now Pat. No. 10,270,987, and a continuation-in-part of application No. 15/362,023, filed on Nov. 28, 2016, now Pat. No. 10,270,997.

(60) Provisional application No. 62/385,204, filed on Sep. 8, 2016, provisional application No. 62/385,027, filed on Sep. 8, 2016.

(51) Int. Cl.
*H04N 5/232* (2006.01)
*H04N 5/353* (2011.01)
*H04N 5/343* (2011.01)
*H04N 5/347* (2011.01)
*H04N 5/378* (2011.01)

(52) U.S. Cl.
CPC ........... *H04N 5/347* (2013.01); *H04N 5/3532* (2013.01); *H04N 5/3575* (2013.01); *H04N 5/378* (2013.01); *H04N 5/37457* (2013.01)

(56) References Cited

U.S. PATENT DOCUMENTS

| | | | |
|---|---|---|---|
| 2006/0203113 A1* | 9/2006 | Wada | H04N 5/347 348/302 |
| 2009/0108176 A1 | 4/2009 | Blanquart | |
| 2010/0309340 A1 | 12/2010 | Border et al. | |
| 2013/0057744 A1 | 3/2013 | Minagawa et al. | |
| 2014/0145067 A1* | 5/2014 | Suh | H04N 5/3742 250/208.1 |
| 2014/0263964 A1 | 9/2014 | Yang et al. | |
| 2014/0333809 A1 | 11/2014 | Bock | |
| 2016/0165159 A1* | 6/2016 | Hseih | H04N 5/37457 348/273 |
| 2016/0353034 A1 | 12/2016 | Mauritzson et al. | |

OTHER PUBLICATIONS

International Search Report and Written Opinion issued in PCT/EP2017/072630 dated Nov. 28, 2017.
International Search Report and Written Opinion dated Aug. 16, 2018, regarding PCT/CA2018/050636.

* cited by examiner

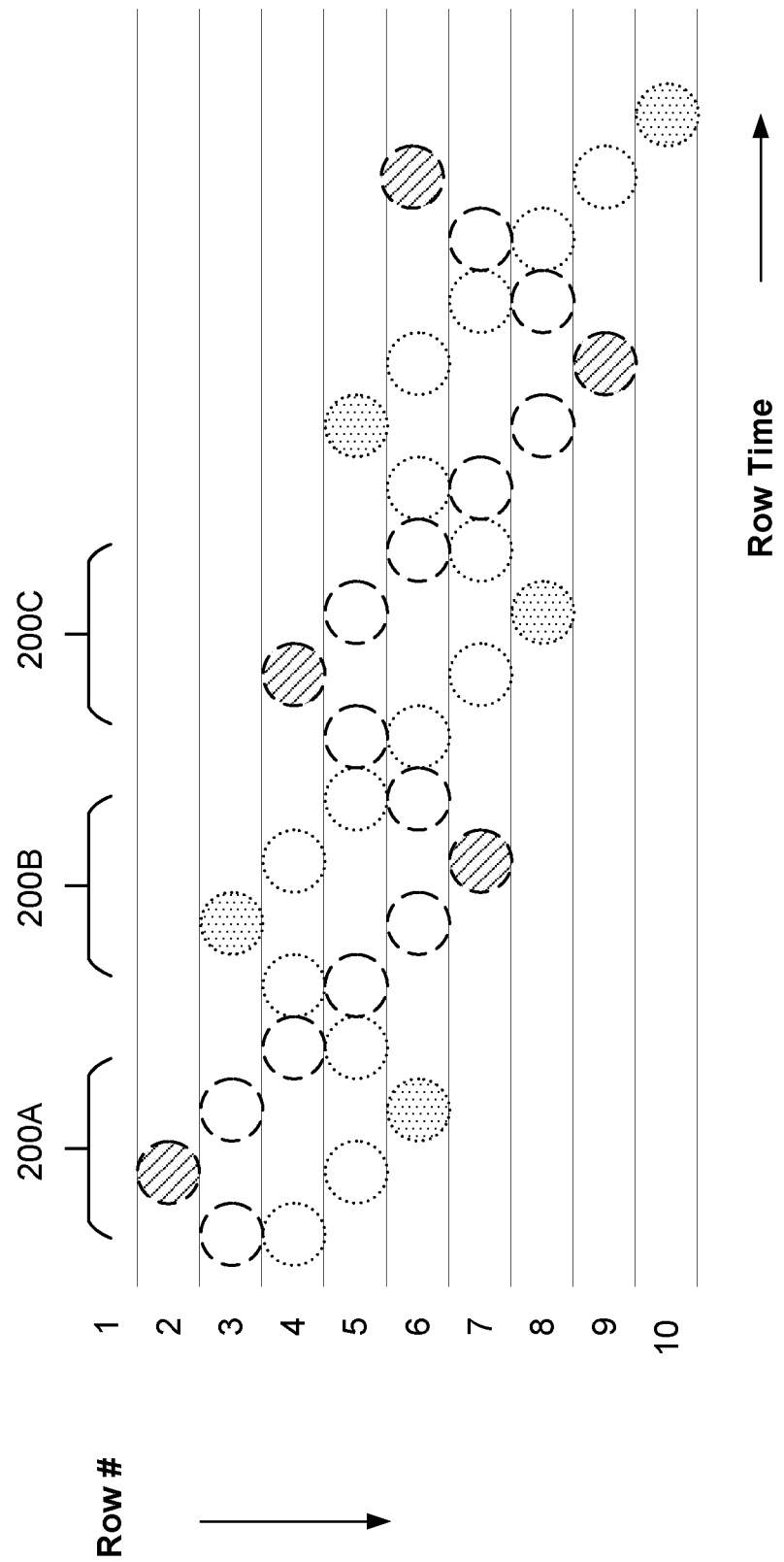

IMAGER WITH VERTICAL ROW ADDRESSING

CROSS REFERENCE TO RELATED APPLICATIONS

This application is a continuation-in-part of U.S. application Ser. No. 16/389,772, filed Apr. 19, 2019, which is a continuation of U.S. application Ser. No. 15/697,349, filed Sep. 6, 2017, and now issued as U.S. Pat. No. 10,270,987, which claims priority to U.S. Provisional Application Ser. No. 62/385,204, filed on Sep. 8, 2016. U.S. Pat. No. 10,270,987 is also a continuation-in-part of U.S. application Ser. No. 15/362,023, filed Nov. 28, 2016, and now issued as U.S. Pat. No. 10,270,997, which claims priority to U.S. Provisional Application Ser. No. 62/385,027, filed on Sep. 8, 2016. The entire contents of each of these applications is hereby incorporated by reference herein in their entirety.

TECHNICAL FIELD

The disclosure herein generally relates to images sensors, and, more particularly, to a CMOS imager with vertical row addressing for high framerate and increased transfer time for pixel readout.

BACKGROUND

Complementary metal oxide semiconductor ("CMOS") image sensors are widely used in digital cameras to produce digital images by converting optical signals into electrical signals. In operation, CMOS image sensors may convert an optical signal into an electrical signal using a multitude of pixels that each include a photodiode and a read-out circuit. The photodiode generates electric charges using absorbed light, converts the generated electric charges into an analog current, and delivers the analog current to the read-out circuit. The read-out circuit may convert the analog signal into a digital signal and outputs the digital signal.

Certain CMOS image sensor pixel circuits are formed using four transistors and are known and referred to as 4T image sensor pixels or "4T pixels." FIG. 1 illustrates an exemplary design of a 4T pixel 10 connected to a bit-line 20. As shown, the 4T CMOS image sensor pixel includes a photodiode ("PD") that provides the photon to electron conversion, while a floating diffusion ("FD") point provides the electron to voltage conversion. The voltage per electron conversion of the FD is known as conversion gain ("CG") and is an important parameter for CMOS image sensors. Conversion gain boosts the pixel signal relative to the analog noise, thereby reducing the noise floor, and thereby enabling performance at lower light levels.

During operation, the pixel is reset when the reset transistor ("RST") and transfer gate ("TG") are turned on simultaneously. The RST signal will set the floating diffusion FD to a voltage level. Next, the transfer gate TG is turned off (disconnecting the photodiode PD and floating diffusion FD) and the photodiode PD is left to integrate light. After integration, the signal measurement occurs. First, the reset transistor RST is turned on and off to reset the floating diffusion FD. Immediately after this, the reset level is sampled from the floating diffusion FD and stored on the column circuit, i.e., the bit-line. Next, the transfer gate TG is turned on and off which allows charge on the photodiode PD to transfer to the floating diffusion (FD). Once the charge transfer is complete, this charge (the photodiode signal level plus the floating diffusion reset level) is measured and stored on the bit-line as well. These two stored voltages are then differenced ($D_{sig}-D_{rst}$) to determine the photodiode signal level. As will be described in detail below, the transfer of charge from each photodiode takes typically 1 μs. However, if this time becomes too short, artifacts like incomplete charge transfer and lag will occur in the final image.

SUMMARY

According, the exemplary embodiments of the present invention provides a CMOS imager with vertical row addressing that allows for high framerate, while increasing transfer time for pixel readout, such that the transfer time for each photodiode is not too short causing incomplete transfer resulting artifacts and other defects. To do so, the exemplary imager uses a single shift register for addressing transfer gates, the row driver configuration being able to dynamically up/down shift of the tokens in the shift register to address multiple rows with a single shift register.

Thus, in an exemplary aspect of the disclosure, an imager is provided that includes a pixel array including a plurality of columns having a plurality of rows of pixels, with each pixel having a plurality of photodiodes and a common readout circuit configured to store respective accumulation voltages from each of the plurality of photodiodes. Moreover, the imager includes row driver circuitry configured control the pixel array for pixel addressing and readout, with the row driver circuitry comprising a plurality of shift registers and a plurality of level shifters coupled to the respective outputs of the plurality of shift registers; and an image sensor controller configured to control the plurality of shift registers to address the plurality of rows of pixels in the pixel array, such that the respective accumulation voltage of at least one photodiode of respective pixels in at least two rows of pixels is concurrently read out on a readout channel coupled to a bit line column. In an exemplary aspect, the row driver circuitry is configured to dynamically upward and downward shift control signals to the pixel array, such that at least two rows of pixels in a single column of the pixel array are addressed during a single row time, with at least one additional row of pixels disposed between the addressed two rows of pixels and that is not addressed during the single row time by the row driver circuitry. In another exemplary aspect, an operation time for controlling the pixel array is defined based on a number of the at least one additional row of pixels that is not addressed during the single row time by the row driver circuitry. In yet another an exemplary aspect, the row driver circuitry comprises a pair of transfer shift registers configured to address the at least two rows of pixels based on the control signals to transfer the accumulation voltages to the bit line column. Furthermore, the level shifters can be coupled to the pixel array and are configured to increase a voltage level of the control signals output by the row driver circuitry and applied to the pixel array, and the plurality of rows of pixels comprise a linear configuration and have a symmetrical layout that is identical to one another other.

In another exemplary aspect, the row driver circuitry further comprises a pair of reset shift registers configured to reset the common readout circuit of each pixel in the plurality of rows of pixels.

In another exemplary aspect, the row driver circuitry further comprises a pair of select shift registers configured select the at least two rows of pixels in the single column of the pixel array, such that the at least two rows of pixels are configured for readout in response to the pair of transfer shift registers address the at least two rows of pixels for transfer of the accumulation voltages to the bit line column.

In another exemplary aspect, during subsequent row time after the single row time, the row driver circuitry is configured to dynamically upward and downward shift the control signals to the pixel array, such that another at least two rows of pixels in the single column of the pixel array are addressed that are different than the at least two rows of pixels addressed during the single row time.

In another exemplary aspect, each pixel in the pixel array comprises a plurality of transfer gates that are each coupled to a corresponding photodiode of the plurality of photodiodes and the common readout circuit is further configured to output the accumulation voltage of each of the plurality of photodiodes to the readout channel.

Other aspects of apparatuses described herein will become readily apparent to those skilled in the art based on the following detailed description, wherein various aspects of memory are shown and described by way of illustration. These aspects may be implemented in many different forms and its details may be modified in various ways without deviating from the scope of the present invention. Accordingly, the drawings and detailed description provided herein are to be regarded as illustrative in nature and not as restricting the scope of the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 7A and 7B illustrate timing diagrams showing an example of pixel addressing using the row driver configuration of the image sensor according to an exemplary embodiment.

DETAILED DESCRIPTION

Figure 1:
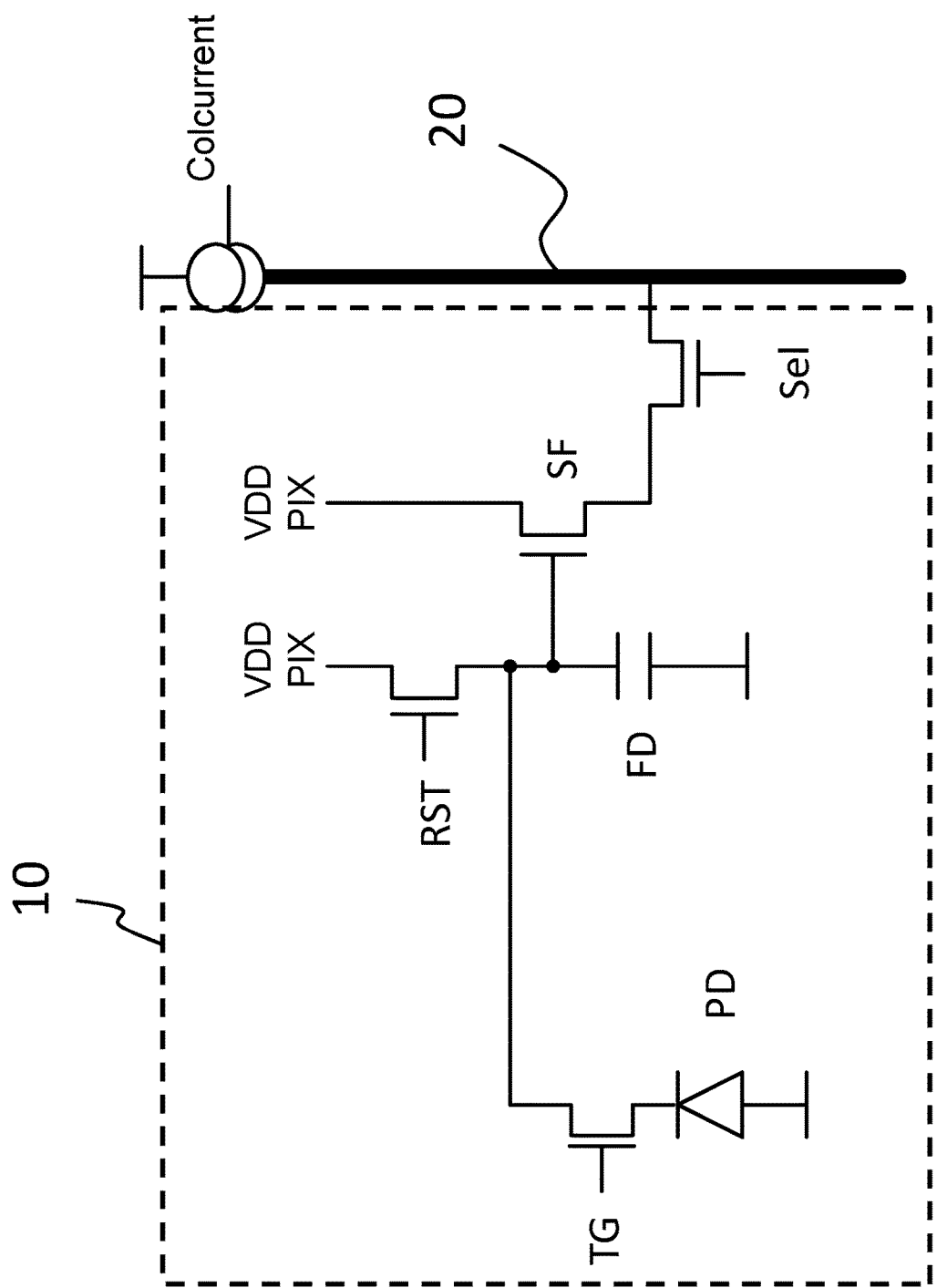
FIG. 1 illustrates a conventional design of a 4T pixel configuration of a CMOS image sensor connected to a column circuit.

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In one configuration, the number of rows and columns of photodiodes in a pixel array of a CMOS image sensor may both be doubled. As a result, there may be four times of photodiodes in an image area compared with the number of photodiodes when the image area is filled with 4T pixels. In such a configuration, each pixel area that may originally be occupied by one 4T pixel may contain four photodiodes. Such a pixel that contains four photodiodes may be referred to as a 4T shared pixel, or a shared pixel.

Figure 2:
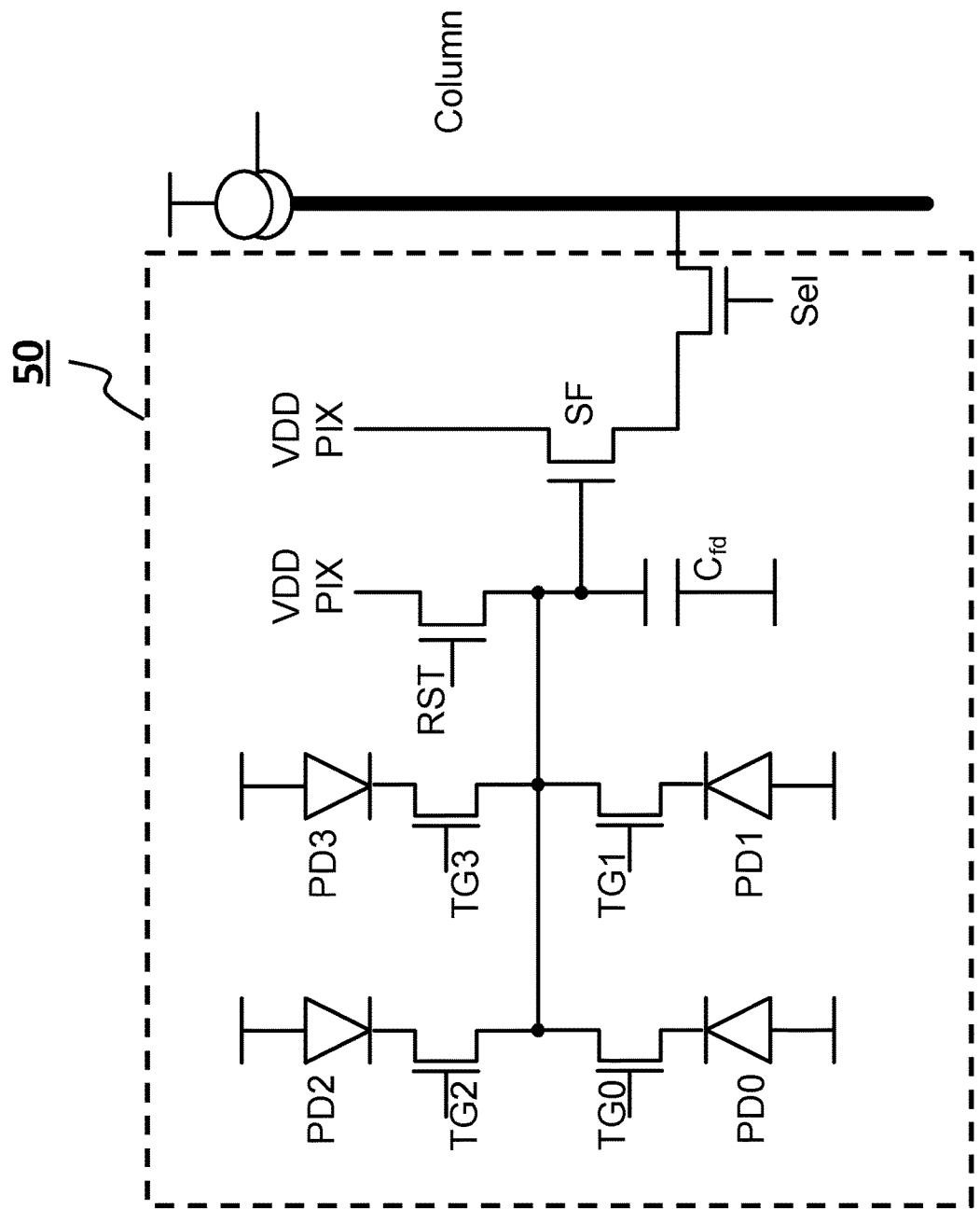
FIG. 2 illustrates a schematic diagram of an exemplary 4T shared pixel CMOS image sensor that can be implemented in connection with an exemplary embodiment.

FIG. 2 illustrates a schematic diagram of an exemplary 4T shared pixel CMOS image sensor that can be implemented in connection with an exemplary embodiment of the image sensor described herein. The shared pixel 50 includes a similar configuration as the 4T pixel described above except that it includes four sub-pixels, e.g., photodiodes PD0-PD3 that are each driven by a respective transfer gate (shown as TG0-TG3). As shown, each of the transfer gates TG0-TG3 shares a common readout circuit and is connected to floating diffusion point, i.e., capacitor $C_{fd}$. As further shown, both transistor (reset transistor RST) and transistor SF have drains connected to the voltage source of the pixel (e.g., VDD PIX). The source of reset transistor RST is connected to the floating diffusion point $C_{fd}$, and the source of transistor SF is connected to the drain of the select transistor Sel. The source of select transistor Sel is connected to the readout column for outputting the pixel data as will be described below.

According to an exemplary aspect, each sub-pixel (i.e., each of photodiodes PD0-PD3) can be read out separately by activating its corresponding transfer gate. Thus, to read out photodiode PD0, the transfer gate TG0 is turned on/activated. Similarly, photodiode PD1 is read out by activating transfer gate TG1, and so forth. In some instances, multiple sub-pixels will be read out at the same time as a single read operation by activating the respective transfer gates simultaneously.

In order to take advantage of the higher resolution provided by the shared pixels, each photodiode of a shared pixel may need to be read out individually. To read out each photodiode of a shared pixel individually, four wires may be needed to addressed each photodiodes individually. However, having four wires connected to a shared pixel may degrade the performance of the shared pixel, e.g., by blocking the optical paths of the shared pixel, and/or by detrimentally affecting the conversion gain, fill factor, sensitivity of the image sensor. Thus, it may be desirable to reduce the interconnection/wiring (and other circuitry, such as level shifters described below) associated with a shared pixel while maintaining the capability to read out each photodiode of the shared pixel individually.

According to an exemplary embodiment, a pixel array for an image sensor can be provided that includes a plurality of the 4T shared pixel described above with respect to FIG. 2.

Figure 3:
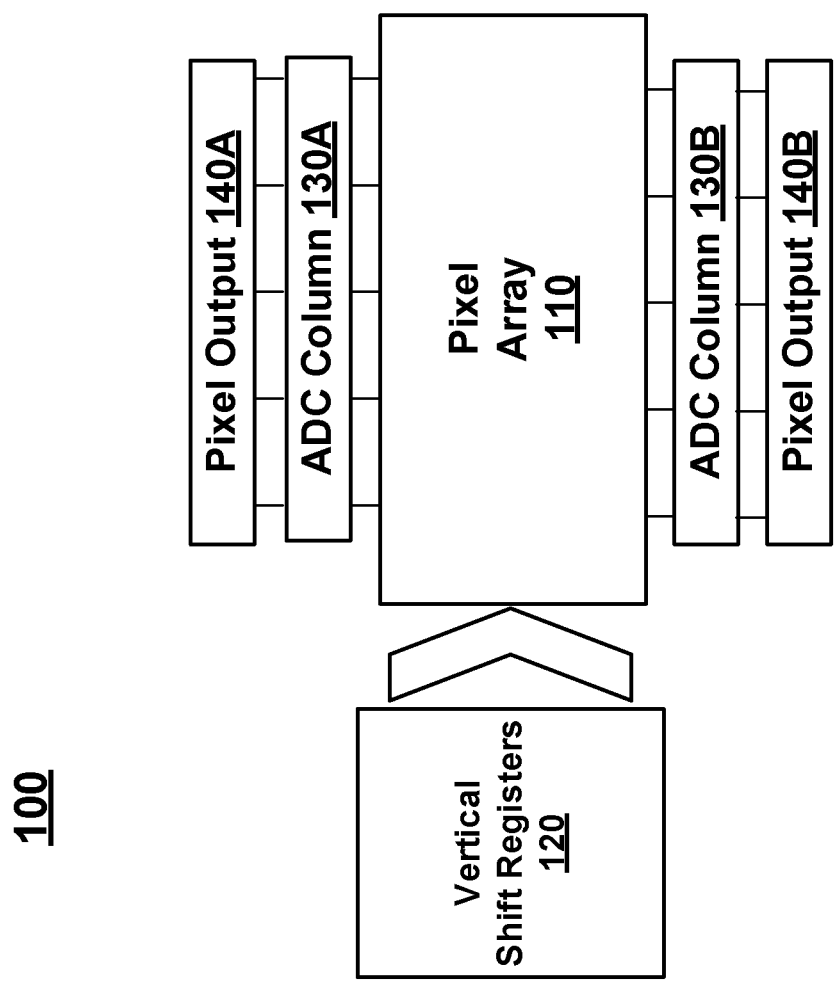
FIG. 3 illustrates a block diagram of an imager with vertical row addressing according to an exemplary aspect.

In particular, FIG. 3 illustrates a block diagram of an imager with vertical row addressing according to an exemplary aspect.

As shown, the imager 100 generally includes a pixel array 110, a plurality of vertical shift registers 120 configured to control the image capture and pixel readout of the pixel array 110, a pair of ADC (analog to digital converter) columns 130A and 130B coupled on opposing sides of the pixel array 110, and pixel output circuitry 140A and 140B further coupled to the ADC columns 130A and 130B for pixel data readout. It is noted that for purposes of FIG. 3, the shift registers 120 are only shown on one side of pixel array. However, according to an exemplary embodiment, the vertical shift registers 120 and be disposed on both the left and right sides of the pixel array 110. By putting them on both sides of the array, the drive strength for driving the liners (i.e., the rows) in the pixel array 110 doubles.

According to an exemplary aspect, pixel array 110 can be comprised of 4224 (H)×2248 (V), 2.5 μm, 4T-4 shared pixels as shown in FIG. 2 described above. Moreover, although not shown, an external programmable timing generator can be used to provide flexible vertical addressing and to support different readout modes and different binning or quincunx readout schemes. As will be described in greater detail below, the pixel array 110 is driven by on-chip digital shift registers 120 followed by level shifters. Moreover, in an exemplary aspect, to reduce the number of required level shifters, the cross connected topology of the pixel is used as provided in FIG. 2.

The exemplary row driver and pixel connections will be described below with respect to FIG. 5. However, in general, each column of shared pixels has one charge-domain multi-slope column ADC. Placing the ADC columns 130A and 130B on opposing sides of pixel array 110 will also yield a width of 10 μm per ADC per side. In general, it is noted that to enable the highest possible framerate, processes like light integration, column sampling, A/D conversion and output multiplexing will run in parallel. Thus, according to the exemplary aspect, every ADC on the ADC columns 130A and 130B is sampling on one capacitor, while converting on a second capacitor to maximize the column settling time and maximizing the ADC conversion time per row readout.

Figure 4:
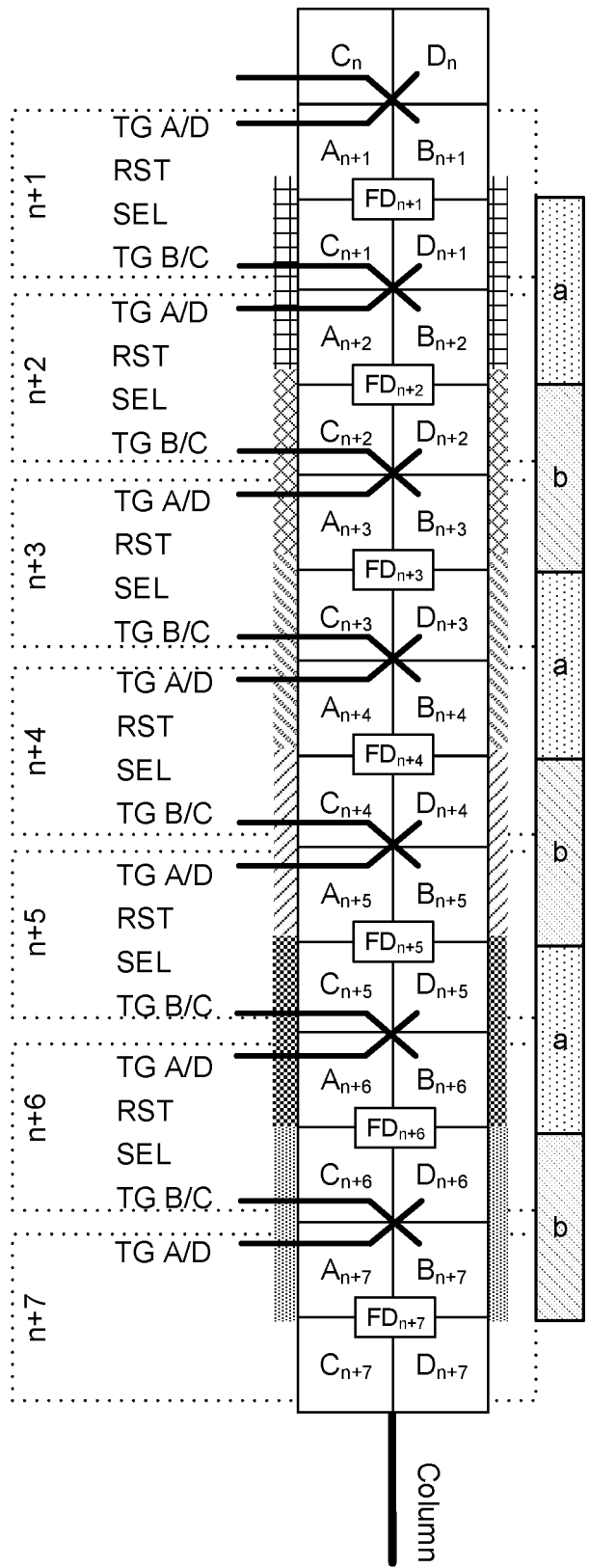
FIG. 4 illustrates a top-down view of a row of pixels of the a pixel array according to an exemplary embodiment.

FIG. 4 illustrates a top-down view of a row of pixels of the a pixel array 110 according to an exemplary embodiment. As described above, the pixel array 110 includes a plurality of 4T-4 shared pixels. Moreover, multiple processes are required to readout the pixel array 110 of the imager including these plurality of shared pixels. In particular, the processes include pixel reset, readout of reset value, transfer, and readout of reset plus video value. Accordingly, with reference to FIG. 4, to transfer a value of a particular photodiode in a pixel, the respective transfer gate must be activated. In this instance, transfer gate signals are applied to sub-pixels in adjacent rows, to read out two values concurrently.

As shown in this exemplary embodiment, FIG. 4 illustrates a row 200 that includes shared pixels (i.e., n=1, n+2 . . . n+7) that each include sub-pixels $A_{n+1}$, $B_{n+1}$, $C_{n+1}$ and $D_{n+1}$, $A_{n+2}$, $B_{n+2}$, $C_{n+2}$ and $D_{n+2}$ and so forth. It should be appreciated that these sub-pixels $A_{n+1}$, $B_{n+1}$, $C_{n+1}$ and $D_{n+1}$, $A_{n+2}$, $B_{n+2}$, $C_{n+2}$ and $D_{n+2}$ and so forth, can each correspond to sub-pixels PD0-PD3 of the 4T-4 shared pixel as shown in FIG. 2 and discussed above. Moreover, each 4T shared pixel includes a floating diffusion point, which is illustrated as $FD_{n+1}$, $FD_{n+2}$ and so forth.

Accordingly to the exemplary embodiment, each transfer gate is activated for two adjacent sub-pixels in the vertical direction (relative to the array 110) that are in different adjacent pixel rows (e.g., in rows n and n+1, in rows n+1 and n+2 and so forth). Thus, the transfer gates for sub-pixels $C_{n+1}$ and $B_{n+2}$ may first be activated by a transfer gate signal TG B/C. It is noted that since sub-pixels $C_{n+1}$ and $B_{n+2}$ are in different rows, i.e., different shared pixels n+1 and n+2, the values of the sub-pixels $C_{n+1}$ and $B_{n+2}$ may be read out during the same readout period. Next, a transfer gate signal A/D can be applied to activate sub-pixels $A_{n+2}$ and $D_{n+1}$ in a similar process. After the activation by the pair of transfer gate signals, the CMOS image sensor has performed a readout of sub-pixels $A_{n+2}$, $B_{n+2}$, $C_{n+1}$, and $D_{n+1}$. In general, this same readout process can be performed for each pixel in the row 200, i.e., the pixels correspond to n+1, n+2 . . . n+7.

In general, it is known that the transferring of sub-pixel values along with the additional processes (e.g., pixel reset, select, etc.) can affect the performance of the imager. Pixel reset is a very short event, i.e., removing charge from the floating diffusion in a pixel can takes typically only nano seconds (e.g., 10s to hundreds of nano seconds). After reset, the pixel value will be sampled through the column to the readout circuitry as described above (e.g., using sample/hold capacitors to the ADC columns). Moreover, the transfer of charge from each photodiode (e.g., 4T-4 shared pixels shown in FIG. 2) or memory node (e.g., 6T or more pixels) takes typically 1 μs. If this time becomes too short, artifacts like incomplete charge transfer and lag will occur in the final image. In addition, each pixel value will be sampled through the column as described above. If pixel resolution increases (e.g., more rows of pixels), column resistance and a capacitance will increase, which in turn will increase settling time for a signal to be read out. Increasing framerates also shorten the available time. For example, an imager with 1124 rows of 4T shared pixels with a framerate of 180 Hz read out with digital correlated double sampling will have a rowtime calculated according to the following Formula 1:

$$\frac{1}{(2*180)} \Big/ \text{\#rows}/\text{\#shared pixels} = \frac{2.78 \text{ ms}}{(1125*4)} = 600 \text{ ns } \underline{rowtime}$$

Currently, conventional imagers will run at lower framerates and/or will trade the transfer time or will not perform correlated double sampling resulting in higher readout noise.

Thus, according to an exemplary aspect, it is noted that a feasible transfer time of 1 μs requires two rows of pixels to be addressed concurrently. That is, while one row is being selected, another one is being transferred and so forth. In the exemplary embodiment, to minimize the number of individual shift registers, a row addressing scheme is provided that uses dynamic forward/backward shifting of the transfer tokens (i.e., in the vertical digital shift registers). With the exemplary vertical addressing scheme, a high framerate is achieved while maintaining a transfer time of for example, and allowing the column to settle during the full row time.

Figure 5:
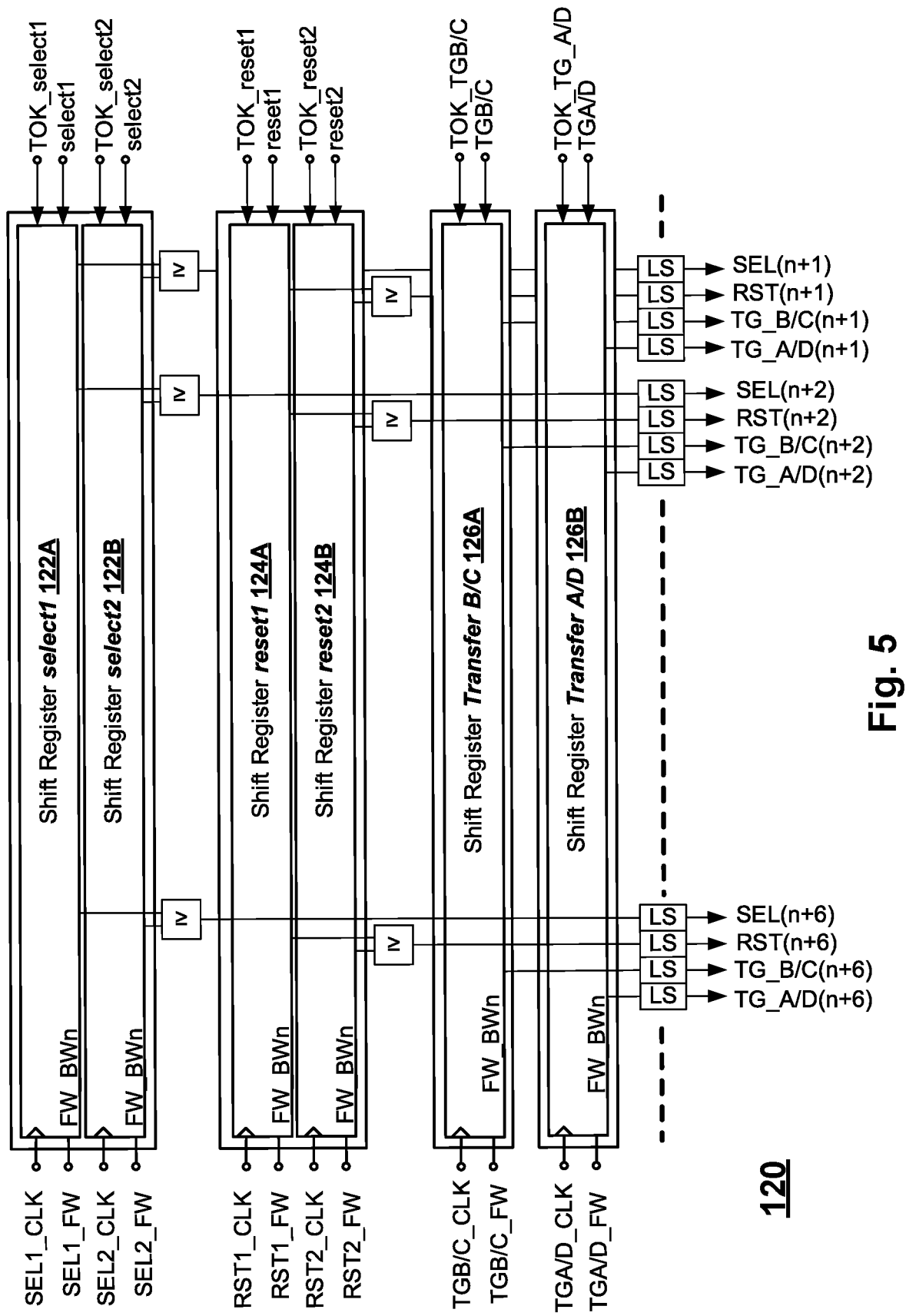
FIG. 5 illustrates a block diagram of the row driver configuration of the image sensor according to an exemplary embodiment.

FIG. 5 illustrates a block diagram of the row driver configuration 120 of the image sensor according to an exemplary embodiment. As shown, the row driver configuration 120 comprises a plurality of shift registers configured to drive the processes for pixel readout of pixel array 110 and a plurality of level shifters LS coupled to each output of the shift registers. In an exemplary embodiment, the shift registers are configured to run in a low voltage domain as "digital processing", for example, 1V8 for a 180 nm process or 1v2 for a 65 nm process. Moreover, the pixels operate at higher voltages. Therefore, the level shifters LS are configured to "level shift" the output of the shift registers from the lower voltages to the higher voltages to be applied to the pixels. It is noted that the level shifter are disposed at the output of the addressing scheme to interface with the actual pixel array 110.

As further shown in FIG. 5, the row driver configuration 120 includes a first pair of shift registers 122A and 122B that are configured to drive the select signals Select1 and Select2, a second pair of shift registers 124A and 124B that are configured to drive the reset signals Reset1 and Reset2, and third pair of shift registers 126A and 126B that are configured to drive the transfer signals (also referred to as transfer tokens) Transfer B/C and Transfer A/D. As further shown, each of the plurality of shift registers are coupled to each pixel (with the level shifters LS interposed therebetween) of the exemplary column as described above with respect to FIG. 4. That is, the shift registers are coupled to the select, reset and transfer signals in each of the rows n+1, n+2 . . . n+6 and so forth, which correspond to the input signals of FIG. 4.

According to the exemplary embodiment, the row driver configuration 120 is configured to drive pixel transfer and readout while increasing the available time. To do so, the row driver configuration 120 performs these processes (e.g., reset, select and transfer) in parallel. In other words, if the transfer is applied, another process is also performed in parallel. For example, in an exemplary embodiment of the imager, another row can be read in parallel, which also means that another row needs to be addressed.

Moreover, it should be appreciated that the row driver configuration 120 uses a single shift register for addressing each of the transfer gates. For example, shift register 126A addresses each of transfer gates for sub-pixels B and C and shift register 126B addresses each of transfer gates for sub-pixels A and D. Moreover, it is noted that while the exemplary row driver configuration 120 is configured to address cross connected transfer gates, the exemplary configuration can also be implemented for a single transfer gate connection. In either case, the exemplary row driver configuration 120 is configured to perform a dynamic up/down shifting of the transfer tokens in the shift registers (as shown in FIG. 5) to address multiple rows with a single shift register (i.e., shift register 126A and 126B) for each token.

Figure 6:
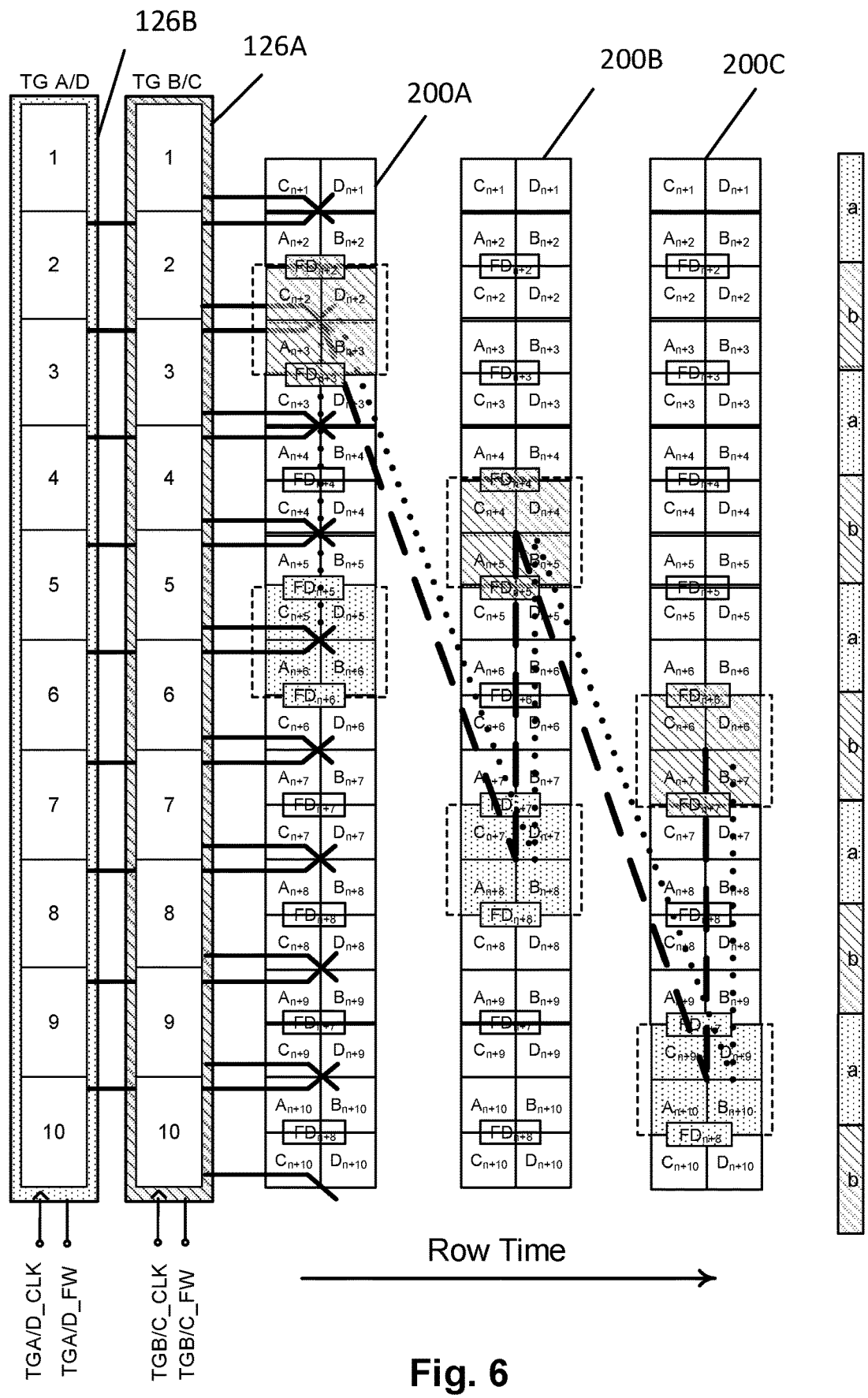
FIG. 6 illustrates a block diagram for illustrating a timing of the row driver configuration of the image sensor according to an exemplary embodiment.

FIG. 6 illustrates a block diagram for illustrating a timing of the row driver configuration of the image sensor according to an exemplary embodiment. In general, a similar row of 4T-4 shared pixels is shown that corresponds to row 200 as described above with respect to FIG. 4. In this example, row 200A, 200B and 200C illustrate different rowtimes of the same pixel row. In general, the term rowtime should be considered the throughput time required on the columns, and calculated based on Formula 1 as described above. Accordingly, the rowtime is also the sample time for the columns (with two column capacitors) and it is also the time available for the A/D conversion. As can be seen in FIG. 6, the rowtime (along the X axis) is effectively the sample time for each addressed shared pixel and readout the corresponding pixel data.

As shown, row driver configuration includes shift registers 126A and 126B that are configured to drive the transfer signals (also referred to as transfer tokens) Transfer B/C and Transfer A/D, as noted above. In other words, these shift registers correspond to the shift registers 126A and 126B of FIG. 5. In general, a shift register is a cascade of flip flops that share the same clock (e.g., TG B/C_CLK and TG A/D_CLK), in which the output of each flip-flop is connected to the data input of the next flip-flop in the chain. This configuration results in a circuit that shifts by one position the bit array stored in it, "shifting in" the data present at its input and "shifting out" the last bit in the array, at each transition of the clock input. As implemented in the exemplary embodiment, the shift registers 126A and 126B are configured to dynamically forward and backward shift of the transfer tokens.

More particularly, the exemplary diagram for the row driver configuration also shows two pixel outputs "a" (shown with dotted hatching) and "b" (shown with diagonal lined hatching). It is noted that these outputs can be coupled to a bit line for reading out the pixel data as described above. As also shown, two shared pixels can be addressed at each row count. That is, during the first row count (or row time) as shown at time 200A, the floating diffusions $FD_{n+2}$ and $FD_{n+3}$ can be addressed and readout as well as sub-pixels $B_{n+3}$ and $C_{n+2}$ as addressed by shift register 126A and sub-pixels $A_{n+3}$ and $D_{n+2}$ as addressed by shift register 126B. The pixel readout is shown with a dashed box and diagonal cross hatching to illustrate the output "b" of the pixel array.

Next, the shift registers 126A and 126B can be dynamically down shifted to address and readout the floating diffusions $FD_{n+7}$ and $FD_{n+8}$ as well as sub-pixels $B_{n+8}$ and $C_{n+7}$ as addressed by shift register 126A and sub-pixels $A_{n+8}$ and $D_{n+7}$ as addressed by shift register 126B. The pixel readout is shown with a dashed box and dotted hatching to illustrate the output "a" of the pixel array. This process can continue by upward shifting to the readout $FD_{n+4}$ and $FD_{n+5}$ as well as sub-pixels $B_{n+5}$ and $C_{n+4}$ as addressed by shift register 126A and sub-pixels $A_{n+5}$ and $D_{n+4}$ as addressed by shift register 126B. These readouts are performed at the row time indicated by 200B. This process can then continue to the row time indicated by 200C using a similar process.

It should be appreciated that the dashed line indicates the transfer signal (or token) that is generated by shift register 126A as it is dynamically upward and down ward shifted to transfer the accumulated charge from each respective sub-pixel. Likewise, the dotted line indicates the transfer signal (or token) that is generated by shift register 126B as it is dynamically upward and down ward shifted to transfer the accumulated charge from each respective subpixel.

Figure 7B:
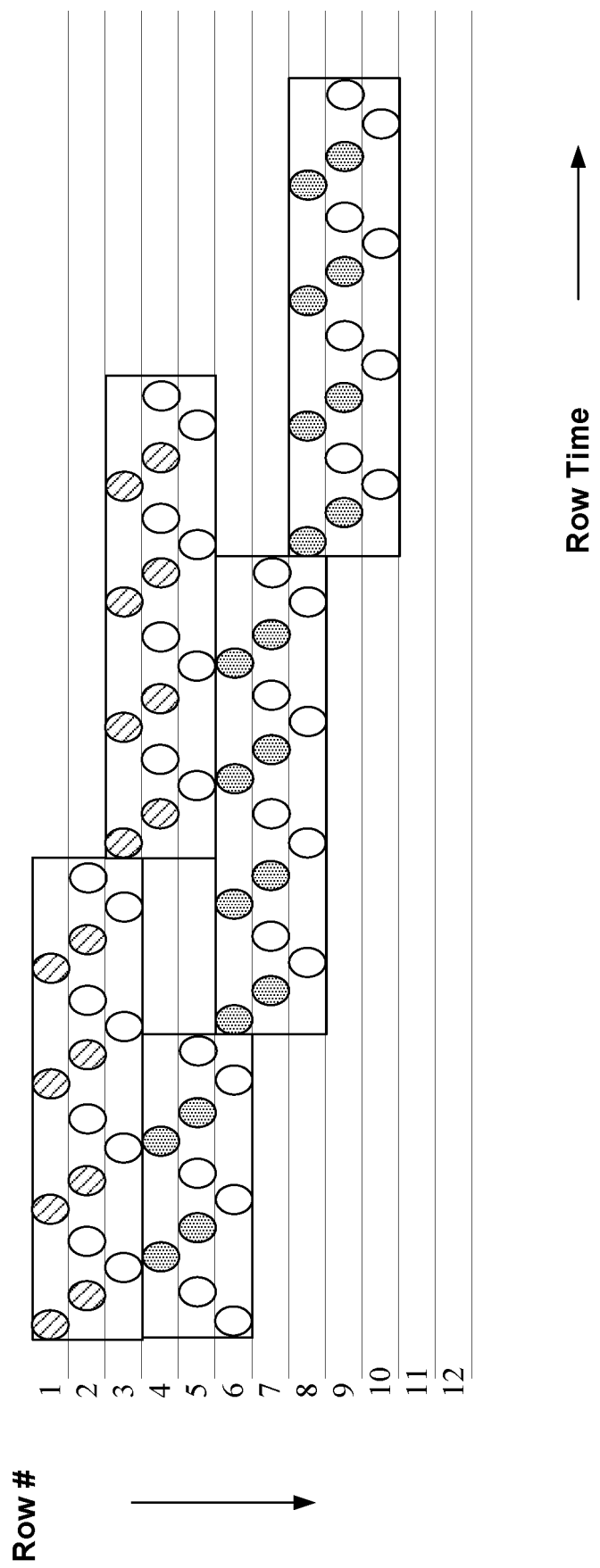

FIGS. 7A and 7B illustrate a timing diagram showing an example of pixel addressing using the row driver configuration of the image sensor according to an exemplary embodiment. As shown in FIG. 7A, the row numbers 1-10 are in the Y axis direction and correspond to the rows of the pixel column 200 as described above. For example, it should be appreciated that each row #1-10 can correspond to rows n+1, n+2 and so forth as shown in FIG. 4, for example. Moreover, as a general matter, it should be appreciated that the number of rows in each vertical column of pixels is not limited to 10 rows as shown in FIG. 6 and can be increased or decreased according to the overall size of the pixel array 110.

In any event, FIG. 7A further shows the rowtime in the X axis direction. In general, a solid dot means that row is actually being addressed while an open dot means the token is moving without being "asserted" for TG (transfer gate) operation. More particularly, the dots with dotted hatching correspond to the outputs "a" for a pixel row addressed at the respective row time and the dots with a diagonal lined hatching correspond to the outputs "b" for a pixel row addressed at the respective row time. It should be appreciated that the row numbers for the token position (i.e., the transfer signal) correspond to the positions of the shift registers 126A and 126B as can be seen in FIG. 8. Thus, the timing diagram of FIG. 7A show the dynamic upward and down shifting of the shift register 126A (diagonal line hatching) and shift register 126B (dotted hatching). Moreover, for clarity, row times 200A, 200B and 200C are shown and also illustrate the particular pixel row being address and readout as described above.

It should be appreciated that shift registers are conventionally used to only shift in one direction and sequentially address all rows. However, to the row driver configuration of the exemplary embodiment as described above, the system is configured to read two rows of pixels alternating, which advantageously provides a "longer than a row-time" transfer time. Addressing multiple rows normally requires more shift registers. However, to the exemplary embodiment, the row driver configuration dynamically shifts back the token in the shift register.

FIG. 7B further illustrates a timing diagram for the Select1 and Select 2 processing signals using the exemplar row driver configuration described herein. Specifically, the dots with diagonal line hatching represent the Select1 signals (i.e., output from shift register 122A of FIG. 5) for the "a" output and the dots with dotted hatching represent the Select2 signals (i.e., output from shift register 122B of FIG. 5) for the "b" output. It should be appreciated from FIG. 7B that at every row time, a select signal is present (i.e., asserted), which represents the longest possible select time. Moreover, there is no trade with other signals (e.g., reset and select) since these signals run in parallel.

In this example, the shift registers for the select signals are configured to a two row time scheme, for the different "a" and "b" outputs, which is provided for the exemplary cross pixel interconnection shown in FIG. 5. As can be seen, the time between operation signals in each row can be increased using the dynamic upward and downward shifting as described above. It is also noted that a similar configuration and processing can be performed to configure the reset functionality, i.e., executed by shift registers 124A and 124B.

Figure 8A:
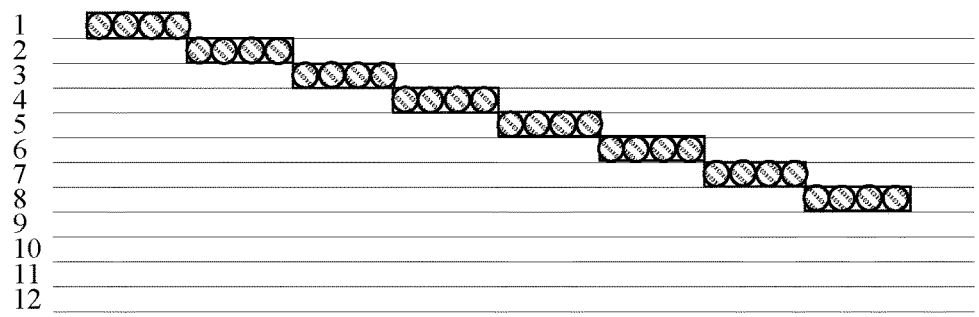
FIGS. 8A-8D illustrate comparative examples compare readout timings for conventional single row addressing with readout timing using multi row addressing using the row driver configuration of the image sensor according to an exemplary embodiment.

FIGS. 8A-8D illustrate comparative examples compare readout timings for conventional single row addressing with readout timing using multi row addressing using the row driver configuration of the image sensor according to an exemplary embodiment. As noted above, shift registers are conventionally used to only shift in one direction and sequentially address all rows. FIG. 8A illustrates such a conventional configuration of a shift register that sequentially shifts through each row in the pixel column. As clearly shown, there is one row time available per sequential operation and no additional time between such sequential operations in the pixel readout processing. Thus, in the case of a 4T-4 shared pixel, the processing operations (i.e., reset, select, transfer and select) would take place at four times in sequence (i.e., as shown by four sequential dots).

Figure 8B:
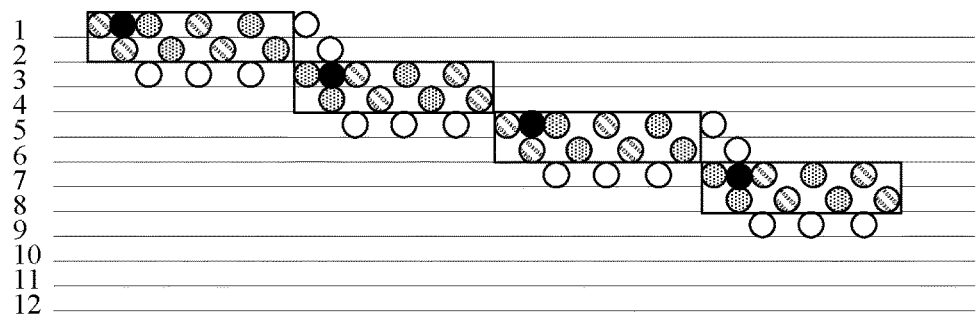
Figure 8C:
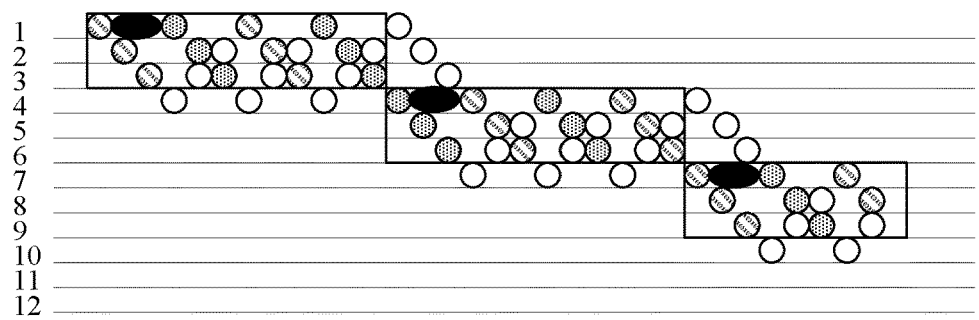
Figure 8D:
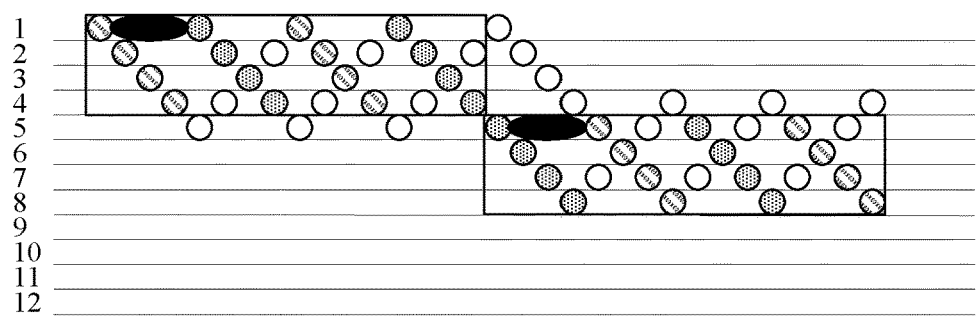

In contrast, each of FIGS. 8B to 8D illustrate various exemplary configurations of the imager using the multi row addressing of the row driver configuration according to an exemplary embodiment. The circle/dot filled in black represents the operation between two operations (e.g., transfer operations) and the dots with diagonal line hatching or dotted hatching represent that the particular pixel in that row is coupled to the bit line column for operation, such as transfer operation by the shift register 126A or the second shift register 126B. As shown in FIG. 8B, for example, by dynamically downward shifting the token by two rows, a first amount of time can be defined between two operations in row #1, with the time being represented by the width of the black dot in the horizontal direction (i.e., the time axis direction).

Advantageously, during this time between operations, any pixel process can be executed, such as transfer or reset for example. In addition, the select itself is available for a full row time. Thus, according to an exemplary aspect, the time between operations is addressed with other shift registers and the amount of shift registers required to use this time varies. For example, transfer signals use a signal shift register and reset signals use two shift registers as discussed above, but only a single shift register for rest can be used in an alternative embodiment. If an image wants to utilize all available time when implementing the scheme shown in FIG. 8C or 8D, for example, multiple shift registers for the transfer tokens can be utilized in an exemplary aspect.

FIGS. 8C and 8D illustrate additional diagrams showing how the time between operations can be further increased. For example, FIG. 8C illustrates the dynamic upward and downward shifting by four rows and FIG. 8D illustrates the dynamic upward and downward shifting by five rows. As illustrated, the pixel is coupled to the bit line column for operation for the additional time during shifting, which in turn increases the width of the black dot that represents time between operations. As shown, increasing the number of rows dynamically shifted will enable a designer of the imager to adjust the available time between operations that is needed for the particular application of the imager. In general, the row time can decrease due more rows (i.e., higher resolution imager) or higher framerate. As clearly shown by the comparative example of FIG. 8A (conventional single shifting) with 8B-8D (using the exemplary embodiment), the row driver configuration using dynamic upward and downward shifting can enable more rows to be addressed while also avoiding the need to add multiple shift registers.

Figure 9:
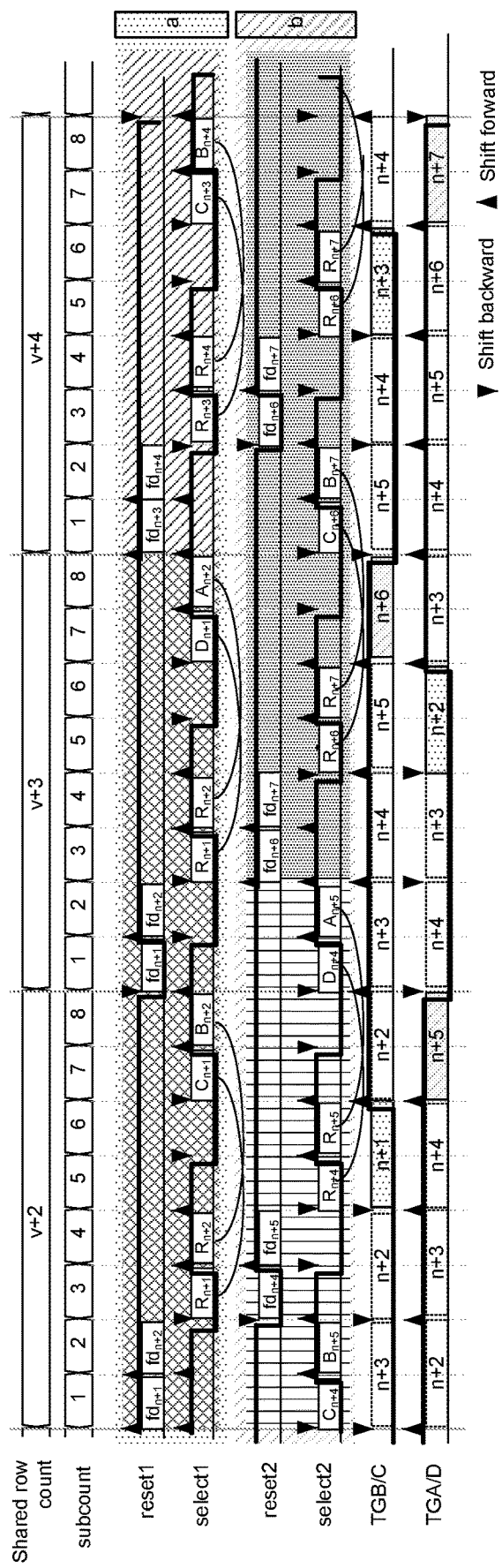
FIG. 9 illustrates a pixel timing readout scheme of signals using imager with vertical row addressing according to an exemplary aspect.

FIG. 9 illustrates a pixel timing readout scheme of signals using imager with vertical row addressing according to an exemplary aspect. The readout scheme 800 can illustrate horizontal timing of a pixel array having a interconnect pattern as described above. As shown, the shared row count equals eight (8) single row times. In other words, because the exemplary imager is configured to read two samples per subpixel in the 4T-4 shared pixel, a value after reset (i.e., a Dark value) and a value after transfer (i.e., a Bright value) for each subpixel results in 2×4=8 row times. It is noted that the timing diagram time axis is therefore shown to be partitioned into counter based cycles. In this regard, the counter performs the count operation in synchronization with clocks having a fixed period; for instance, a shift register clock signal (identified as "subcount") is shown to provide a clock pulse every eight cycles.

Moreover, at each row time, the respective shift register (i.e., shift registers 122A and 122B for the select control signals, shift registers 124A and 124B for the reset control signals and shift registers 126A and 126B for the transfer tokens) is shifted, depending on the setting for forward or backward, of which the forward and backward directions are set by the small up and down black arrows as indicated. In general, it is noted that for imagers, a continuous pattern should be kept to avoid artifacts. As shown in the arrow pattern in FIG. 9, it can be seen that every row time, or for the transfer token, every second row time the shift register is operated. To keep this "cadence" results in similar crosstalk for every pixel operation and after correlated double sampling the crosstalk is removed and/or suppressed. This effect of keeping a cadence is also valid for the up/down shifting patterns as they operate on a regular or periodic basis.

Specifically, the row driver configuration of the exemplary embodiment can be shown for the transfer token TG B/C (corresponding to shift register 126A) and the transfer token TG A/D (corresponding to shift register 126B). For example, the transfer token TG B/C first addresses row n+1 at subcount 5 of shared row count v+2 to readout sub-pixels $C_{n+1}$ and $B_{n+2}$. It is then upward shifted for row n+6 to readout sub-pixels $C_{n+6}$ and $B_{n+7}$. It is then downward shifted for row n+3 to readout sub-pixels $C_{n+3}$ and $B_{n+4}$. A similar control can be performed for transfer token TG A/D using the dynamic upward and downward shift to address pixels rows for readout. It should be appreciated that the a similar dynamic upward and downward shifting is performed for the shift registers outputting the reset signals (reset1 and reset2) and select signals (select1 and select2). These signals will proceed, but otherwise correspond to the pixel rows being addressed by the transfer tokens A/D and B/C as shown and also described above. Thus, using the row driver configuration timing as shown in FIG. 9, the exemplary imager is configured to alternately read two rows of pixels to advantageously provide a "longer than a row-time" transfer time.

Figure 10:
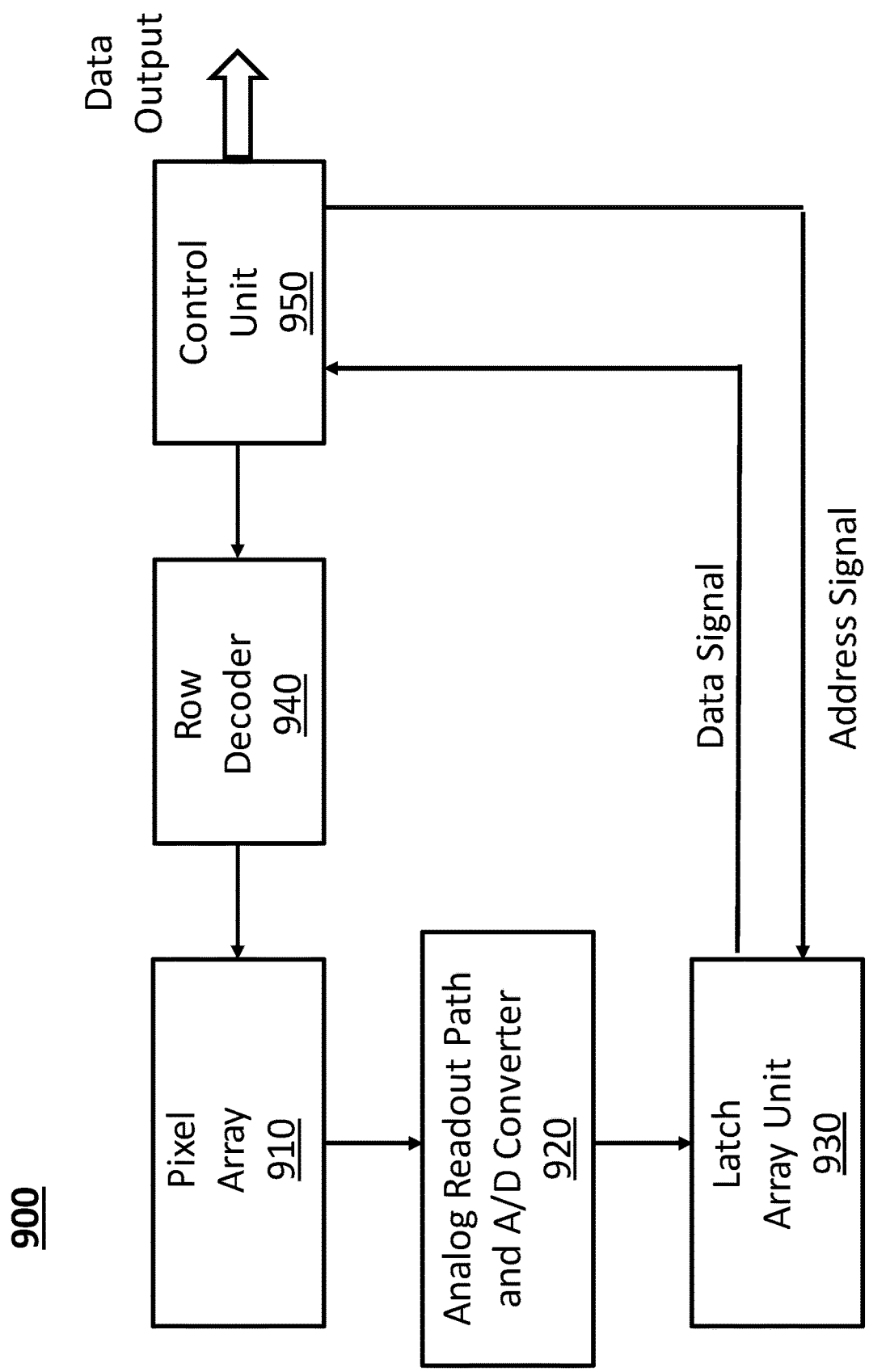
FIG. 10 illustrates a block diagram of an image sensor according to an exemplary embodiment.

FIG. 10 illustrates a block diagram of an image sensor according to an exemplary embodiment. As shown, the image sensor 900 includes a pixel array 910, which can be, for example, pixel array 110 described above that includes a multitude of 4T shared pixel configurations. Furthermore, the output of the pixel array 910 may be fed to an analog readout path and A/D converter 920 (corresponding toe ADC columns 130A and 130B), which is provided for processing the analog output voltages from the pixel array 910 to convert analog pixel signals into digital signals.

As further shown, a latch array unit (or line buffer) 930 is provided in the system for storing the digital signals outputted from the analog readout path and A/D converter 920. The latch array unit can be included in the imager system 900, but not embedded in the imager chip in an exemplary aspect. Moreover, it should be appreciated that the line buffer 930 can include multiple lines depending on the readout order of the pixels of pixel array 910. Moreover, a control unit 950 is provided for providing control signals used in controlling the aforementioned units, and, in particular, the row driver configuration, including the vertical shift registers 120, as described above.

Moreover, the control unit 950 is also configured to driver the A/D converter 920 and any additional circuitry (e.g., pixel output circuitry 140A and 140B, such as multiplexers) for outputting data to the outside (e.g., a display unit) through an interface. For example, the control unit 950 in conjunction with row decoder 940 (which can include the vertical shift registers 120) can generate the activating signals for addressing the pixels for pixel readout, as well as the reset and select processing, for example. Moreover, in one embodiment, the control unit 950 can also generate the control signals to open and close the switches of the capacitor readout.

In general, it is noted that the control unit 950 may include one or more processors and one or more modules for executed the control algorithms described herein. The modules may be software modules running in the processor, or resident/stored in memory, one or more hardware modules coupled to the processor, or some combination thereof. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Furthermore, the control unit 950 may be coupled to the row decoder 940 that is an implementation of the vertical shift registers 120 for the row driver configuration and is configured to output the control signals for addressing the rows and pixels in the pixel array 910 based on a control signal transmitted from the control unit 850.

Preferably, the analog readout path and A/D converter 920 may include comparators as many as the number of columns of the pixel array 910 as described above. Each of the comparators serves a role of converting an analog pixel value of a column in which it is located into a digital signal. The digital signal is stored in the latch array unit 930 including latches as many as the number of the columns of the pixel array 910. The digital signals stored in the latch array unit 930 are subjected to an image processing by the control unit 950 and then, sequentially outputted through output pins of the image sensor in the image processed order.

It should be appreciated that in the examples above, all switching signals are assumed to be positive logic signals, i.e. a high level, or "1" results in closing the switch. It is, however, also possible to use an inverted logic, or to use both, positive and negative, logic in a mixed manner. Moreover, the disclosed CMOS image sensor and method provides an increased speed of the overall readout circuit. In one aspect, the increase in the speed of the readout circuit allows for an increase in the number of pixels in a matrix.

While aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

The previous description is provided to enable any person skilled in the art to fully understand the full scope of the disclosure. Modifications to the various exemplary embodiments disclosed herein will be readily apparent to those skilled in the art. Thus, the claims should not be limited to the various aspects of the disclosure described herein, but shall be accorded the full scope consistent with the language of claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in jurisdictions other than the United States, unless the element is expressly recited using the phrase "means for" or, in the case of a method claim, the element is recited using the phrase "step for."

What is claimed is:

1. An imager, comprising:
   a pixel array including a plurality of columns that each have plurality of rows of pixels, with each pixel having a plurality of photodiodes and a common readout circuit configured to store respective floating diffusion voltages from each of the plurality of photodiodes;
   row driver circuitry configured to control the pixel array for pixel addressing and readout, with the row driver circuitry comprising a plurality of shift registers and a plurality of level shifters coupled to respective outputs of the plurality of shift registers; and
   a timing generator configured to control the plurality of shift registers to address the plurality of rows of pixels in the pixel array, such that the respective floating diffusion voltage of at least one photodiode of respective pixels in at least two rows of pixels is concurrently coupled to a readout circuit coupled to a bit line column,
   wherein the timing generator is configured to control the plurality of shift registers to alternate between addressing, resetting and selecting respective pairs of rows of the plurality of rows of a single column during a single row time,
   wherein the timing generator is further configured to control only two shift registers of the plurality of shift registers to upward and downward shift pixel control signals to the respective pairs of rows during the single row time, such that the respective pairs of rows of pixels in the single column of the pixel array are alternatively addressed by only two shift registers for each of the addressing, resetting and selecting of the pixels of the respective pairs of rows in the single column during the single row time,
   wherein the plurality of shift registers comprise only two shift registers for each of the addressing, resetting and selecting of the pixels and that are configured to alternately address the pair of rows of pixels based on the upward and downward shifted pixel control signals to transfer the floating diffusion voltages to the bit line column,
   wherein the plurality of level shifters are coupled to the pixel array and are configured to increase a voltage level of the pixel control signals output by the row driver circuitry and applied to the pixel array,
   wherein the plurality of rows of pixels comprise a linear configuration and have a symmetrical layout that is identical to one another other.

2. The imager according to claim 1, wherein the plurality of shift registers of the row driver circuitry further comprises a pair of reset shift registers configured to reset the common readout circuit of each pixel in the plurality of rows of pixels.

3. The imager according to claim 2, wherein the plurality of shift registers of the row driver circuitry further comprises a pair of select shift registers configured to select the at least two rows of pixels in the single column of the pixel array, such that the at least two rows of pixels are configured for readout in response to a pair of transfer shift registers that address the at least two rows of pixels for transfer of the floating diffusion voltages to the bit line column.

4. The imager according to claim 1, wherein, during a subsequent row time after the single row time, the timing generator is configured to upward and downward shift the pixel control signals to the pixel array, such that another at least two rows of pixels in the single column of the pixel array are addressed that are different than the at least two rows of pixels addressed during the single row time.

5. The imager according to claim 1, wherein each pixel in the pixel array comprises a plurality of transfer gates that are each coupled to a corresponding photodiode of the plurality of photodiodes and the common readout circuit is further configured to output the floating diffusion voltage of each of the plurality of photodiodes to the readout circuit.

6. An imager, comprising:
   a pixel array including a plurality of columns having a plurality of rows of pixels, with each pixel having a plurality of photodiodes and a common readout circuit configured to store respective floating diffusion voltages from each of the plurality of photodiodes;
   row driver circuitry configured to control the pixel array for pixel addressing and readout, with the row driver circuitry comprising a plurality of shift registers;
   and a timing generator configured to control the plurality of shift registers to address the plurality of rows of pixels in the pixel array, such that the respective floating diffusion voltage of at least one photodiode of respective pixels in at least two rows of pixels is concurrently coupled to a readout circuit coupled to a bit line column,
   wherein the timing generator is configured to control the plurality of shift registers to alternate between addressing, resetting and selecting respective pairs of rows of the plurality of rows of a single column during a single row time,
   wherein the timing generator is further configured to control only two shift registers of the plurality of shift registers to upward and downward shift pixel control signals to the respective pairs of rows during the single row time, such that
   the respective pairs of rows of pixels in the single column of the pixel array are alternatively addressed by only two shift registers for each of the addressing, resetting and selecting of the pixels of the respective pairs of rows in the single column during the single row time,
   wherein the plurality of shift registers comprise only two shift registers for each of the addressing, resetting and selecting of the pixels that are configured to alternately address the pair of rows of pixels based on the upward and downward shifted pixel control signals to transfer the floating diffusion voltages to the bit line column.

7. The imager according to claim 6, wherein the row driver circuitry further comprises a plurality of level shifters coupled to respective outputs of the plurality of shift registers and the pixel array and that are configured to increase a voltage level of the pixel control signals output by the row driver circuitry and applied to the pixel array.

8. The imager according to claim 6, wherein an operation time for controlling the pixel array is defined based on a number of additional rows of pixels that is not addressed during the single row time by the row driver circuitry.

9. The imager according to claim 6, wherein the plurality of rows of pixels comprise a linear configuration and have a symmetrical layout that is identical to one another other.

10. The imager according to claim 6, wherein the plurality of shift registers of the row driver circuitry further comprises a pair of reset shift registers configured to reset the common readout circuit of each pixel in the plurality of rows of pixels.

11. The imager according to claim 10, wherein the plurality of shift registers of the row driver circuitry further comprises a pair of select shift registers configured to select the at least two rows of pixels in the single column of the pixel array, such that the at least two rows of pixels are configured for readout in response to a pair of transfer shift registers that address the at least two rows of pixels for transfer of the floating diffusion voltages to the bit line column.

12. The imager according to claim 6, wherein, during a subsequent row time after the single row time, the timing generator is configured to upward and downward shift the pixel control signals to the pixel array, such that another at least two rows of pixels in the single column of the pixel array are addressed that are different than the at least two rows of pixels addressed during the single row time.

13. The imager according to claim 6, wherein each pixel in the pixel array comprises a plurality of transfer gates that are each coupled to a corresponding photodiode of the plurality of photodiodes and the common readout circuit is further configured to output the floating diffusion voltage of each of the plurality of photodiodes to the readout circuit.

14. An imager, comprising:
a pixel array including a plurality of columns having a plurality of rows of pixels, with each pixel having a plurality of photodiodes and a common readout circuit configured to store respective floating diffusion voltages from each of the plurality of photodiodes;
row driver circuitry configured to control the pixel array for pixel addressing and readout, with the row driver circuitry comprising a plurality of shift registers; and
a timing generator configured to control the plurality of shift registers to address the plurality of rows of pixels in the pixel array,
wherein the timing generator is configured to control the plurality of shift registers to alternate between addressing, resetting and selecting respective pairs of rows of the plurality of rows of a single column during a single row time, and
wherein the timing generator is further configured to control only two shift registers of the plurality of shift registers to upward and downward shift pixel control signals to the respective pairs of rows during the single row time, such that the respective pairs of rows of pixels in the single column of the pixel array are alternatively addressed by only two shift registers for each of the addressing, resetting and selecting of the pixels of the respective pairs of rows in the single column during the single row time.

15. The imager according to claim 14, wherein the plurality of shift registers comprise only two shift registers for each of the addressing, resetting and selecting of the pixels and are configured to alternately address the pair of rows of pixels based on the upward and downward shifted pixel control signals to transfer the floating diffusion voltages to the bit line column.

16. The imager according to claim 15, wherein the timing generator is configured to control the plurality of shift registers, such that the respective floating diffusion voltage of at least one photodiode of respective pixels in at least two rows of pixels is concurrently coupled to a readout circuit coupled to the bit line column.

17. The imager according to claim 14, wherein the row driver circuitry further comprises a plurality of level shifters coupled to the respective outputs of the plurality of shift registers and the pixel array and that are configured to increase a voltage level of the pixel control signals output by the row driver circuitry and applied to the pixel array.

18. The imager according to claim 14, wherein an operation time for controlling the pixel array is defined based on a number of additional rows of pixels that is not addressed during the single row time by the row driver circuitry.

19. The imager according to claim 14, wherein the plurality of rows of pixels comprise a linear configuration and have a symmetrical layout that is identical to one another other.

20. The imager according to claim 14, wherein the plurality of shift registers of the row driver circuitry further comprises:
a pair of reset shift registers configured to reset the common readout circuit of each pixel in the plurality of rows of pixels; and
a pair of select shift registers configured select the at least two rows of pixels in the single column of the pixel array, such that the at least two rows of pixels are configured for readout in response to a pair of transfer shift registers that address the at least two rows of pixels for transfer of the floating diffusion voltages to a bit line column for pixel readout.

21. The imager according to claim 14, wherein, during a subsequent row time after the single row time, the timing generator is configured to upward and downward shift the pixel control signals to the pixel array, such that another at least two rows of pixels in the single column of the pixel array are addressed that are different than the at least two rows of pixels addressed during the single row time.

22. The imager according to claim 16, wherein each pixel in the pixel array comprises a plurality of transfer gates that are each coupled to a corresponding photodiode of the plurality of photodiodes and the common readout circuit is further configured to output the floating diffusion voltage of each of the plurality of photodiodes to the readout circuit.

* * * * *